US008883348B2

(12) United States Patent
Nishino et al.

(10) Patent No.: US 8,883,348 B2
(45) Date of Patent: Nov. 11, 2014

(54) ELECTRODE FOR LITHIUM ION SECONDARY BATTERY

(75) Inventors: Hajime Nishino, Nara (JP); Shuji Tsutsumi, Nara (JP); Shinji Kasamatsu, Osaka (JP); Hideharu Takezawa, Nara (JP); Mikinari Shimada, Kyoto (JP)

(73) Assignee: Panasonic Corporation, Osaka (JP)

( * ) Notice: Subject to any disclaimer, the term of this patent is extended or adjusted under 35 U.S.C. 154(b) by 296 days.

(21) Appl. No.: 11/916,603

(22) PCT Filed: Jul. 21, 2006

(86) PCT No.: PCT/JP2006/314503
§ 371 (c)(1),
(2), (4) Date: Dec. 5, 2007

(87) PCT Pub. No.: WO2007/013375
PCT Pub. Date: Feb. 1, 2007

(65) Prior Publication Data
US 2009/0104529 A1  Apr. 23, 2009

(30) Foreign Application Priority Data
Jul. 28, 2005  (JP) .................................. 2005-219129

(51) Int. Cl.
*H01M 4/00* (2006.01)
*H01M 4/13* (2010.01)
*H01M 4/58* (2010.01)
*H01M 10/0525* (2010.01)
*H01M 4/70* (2006.01)

(52) U.S. Cl.
CPC ............ *H01M 4/70* (2013.01); *H01M 10/0525* (2013.01); *Y02T 10/7011* (2013.01); *Y02E 60/122* (2013.01)
USPC ..................... 429/223; 429/231.9; 429/231.5; 429/231.6

(58) Field of Classification Search
USPC ........................ 429/223, 231.95, 231.5, 231.6
See application file for complete search history.

(56) References Cited

U.S. PATENT DOCUMENTS 5,609,975 A     3/1997  Hasegawa et al.
6,689,512 B2 *  2/2004  Kimura et al. ................ 429/185
(Continued)

FOREIGN PATENT DOCUMENTS

CN     1691372      11/2005
JP     07-335199    12/1995
(Continued)

OTHER PUBLICATIONS

Chinese Office Action issued in Chinese Patent Application No. 2006800276922, mailed Apr. 3, 2009.
Chinese Office Action issued in Chinese Patent Application No. CN 2006800276922 dated Sep. 25, 2009.

* cited by examiner

*Primary Examiner* — Bijay Saha
(74) *Attorney, Agent, or Firm* — McDermott Will & Emery LLP

(57) ABSTRACT

An object of the present invention is to provide an electrode for a lithium ion secondary battery that can ensure a high level of safety even when exposed to severe conditions such as a nail penetration test or crush test, and exhibit excellent output characteristics.
The present invention relates to an electrode for a lithium ion secondary battery having a material mixture containing active material particles capable of reversibly absorbing and desorbing lithium, and a current collector that carries the material mixture, wherein a surface of the current collector has recessed portions, and an area occupied by the recessed portions accounts for not less than 30% of an a material mixture carrying area of the current collector. The present invention further relates to an electrode for a lithium ion secondary battery wherein, in a cut surface obtained by simultaneously cutting a material mixture and a current collector vertically to an electrode plane, the maximum depth of recessed portions is not less than 1 μm, or a difference between an average thickness of a current collector and a maximum thickness of the current collector is not less than 0.35 μm.

3 Claims, 3 Drawing Sheets

(56) References Cited

U.S. PATENT DOCUMENTS

| | | |
|---|---|---|
| 7,455,931 B2 * | 11/2008 | Yasuda et al. ............... 429/218.1 |
| 2003/0091892 A1 * | 5/2003 | Watanabe et al. ............... 429/62 |
| 2005/0048367 A1 * | 3/2005 | Igaki et al. .................... 429/212 |
| 2005/0241137 A1 | 11/2005 | Suzuki et al. |
| 2006/0263690 A1 | 11/2006 | Suhara et al. |
| 2007/0026317 A1 * | 2/2007 | Mitchell et al. ............... 429/233 |
| 2009/0017383 A1 | 1/2009 | Suhara et al. |

FOREIGN PATENT DOCUMENTS

| | | | |
|---|---|---|---|
| JP | 8-31408 | 2/1996 | |
| JP | 10-199574 | 7/1998 | |
| JP | 11-162470 | 6/1999 | |
| JP | 2000-113892 | 4/2000 | |
| JP | 2000 113892 * | 4/2000 | ............. H01M 4/02 |
| WO | WO 2004/030125 A1 | 4/2004 | |

ELECTRODE FOR LITHIUM ION SECONDARY BATTERY

RELATED APPLICATIONS

This application is the U.S. National Phase under 35 U.S.C. §371 of International Application No. PCT/JP2006/314503, filed on Jul. 21, 2006, which in turn claims the benefit of Japanese Application No. 2005-219129, filed on Jul. 28, 2005, the disclosures of which Applications are incorporated by reference herein.

TECHNICAL FIELD

The present invention relates to an electrode for a lithium ion secondary battery suitable for achieving both safety and output characteristics of a lithium ion secondary battery.

BACKGROUND ART

Lithium ion secondary batteries, which have features such as high output, high energy density and light weight, are employed in various applications, and studies of such batteries are still vigorously being conducted. Lithium ion secondary batteries include a non-aqueous electrolyte containing a non-aqueous solvent, and electrodes having a high energy density. Accordingly, a further improvement in safety has been an important issue for lithium ion secondary batteries.

In order to insure a high level of safety, it is necessary to suppress an increase in battery temperature or the like in battery tests performed under extremely severe conditions such as a nail penetration test and a crush test. In the tests, if a material mixture is detached from a current collector, forming an exposed portion of the highly conductive current collector, a possibility increases that a large current may flow or excessive heat generation may occur.

Conventionally, attempts have been made to insure safety by using an electric circuit including a fuse or a PTC element, by utilizing the shut-down function of a separator, by forming a resistance layer for increasing resistance under severe conditions on a current collector surface, or the like, but these methods do not provide sufficient safety (see Patent Document 1). Particularly when a resistance layer is formed on a current collector, the internal resistance of the battery increases even under normal use, causing a problem of low output.

Patent Document 1: Japanese Laid-Open Patent Publication No. Hei 10-199574

DISCLOSURE OF THE INVENTION

Problem to be Solved by the Invention

In view of the above, it is an object of the present invention to provide a lithium ion secondary battery that can insure a high level of safety even when exposed to severe conditions such as a nail penetration test or crush test, and exhibit excellent output characteristics.

Means for Solving the Problem

The present invention relates to an electrode for a lithium ion secondary battery including a material mixture containing active material particles capable of reversibly absorbing and desorbing lithium, and a current collector that carries the material mixture, wherein a surface of the current collector has recessed portions, and an area occupied by the recessed portions accounts for not less than 30% of a material mixture carrying area of the current collector.

As used herein, "the material mixture carrying area of the current collector" means the area of the interface between the material mixture and the current collector. When the current collector has an exposed portion carrying no material mixture, the area of the exposed portion is not included in the material mixture carrying area. The interface between the material mixture and the current collector is considered to have a complicated shape if viewed microscopically, but herein it is considered as a flat plane.

The ratio of the area occupied by the recessed portions to the material mixture carrying area of the current collector is determined by the following method, for example.

First, a cut surface obtained by simultaneously cutting the material mixture and the current collector vertically to the electrode plane is magnified and observed. In the magnified cut surface, line segments that are formed by portions of the current collector surface that do not form recessed portions are approximated with a straight line. Subsequently, the ratio of the total length ($\Delta L$) of line segments that are removed by recessed portions to the length (L) of the obtained approximated straight line: $100 \times \Delta L/L$ is determined. The expression $100 \times \Delta L/L$ is deemed as the ratio of the area occupied by the recessed portions to the material mixture carrying area of the current collector.

The present invention further relates to an electrode for a lithium ion secondary battery including a material mixture containing active material particles capable of reversibly absorbing and desorbing lithium, and a current collector that carries the material mixture, wherein a surface of the current collector has recessed portions, and in a cut surface obtained by simultaneously cutting the material mixture and the current collector vertically to an electrode plane, the maximum depth of the recessed portions is not less than 1 μm.

The present invention further relates to an electrode for a lithium ion secondary battery including a material mixture containing active material particles capable of reversibly absorbing and desorbing lithium, and a current collector that carries the material mixture, wherein a surface of the current collector has recessed portions, and in a cut surface obtained by simultaneously cutting the material mixture and the current collector vertically to an electrode plane, a difference between an average thickness of the current collector and a maximum thickness of the current collector is not less than 0.35 μm.

The recessed portions on the surface of the current collector are formed by, for example, partially embedding the active material particles. Alternatively, it is also possible to first form recessed portions on the surface of the current collector, after which the material mixture containing the active material particles is carried on the current collector.

In the present invention, the active material particles contain, for example, a lithium-containing composite oxide. The lithium-containing composite oxide is represented by a formula (1): $Li_xCo_{1-y-z}Ni_yM_zO_2$. In formula (1), M preferably is at least one element selected from the group consisting of Mn, Ti, Y, Nb, Mo, W, Al, Mg, Ca, Sr and Ba, and formula (1) preferably satisfies $0.97 \leq x \leq 1.1$, $0.05 \leq y \leq 1$ and $0 \leq z \leq 0.35$.

Effect of the Invention

Because a plurality of recessed portions are present on the surface of a current collector, the adhesion between the material mixture and the current collector is improved. Accordingly, even under such severe conditions (e.g., a nail penetration test) as to cause damage on electrode plates, the exposure of the current collector is suppressed to the minimum. Thus, it is possible to reduce a large current in the event of a short circuit, leading to improved safety. Also, the present invention does not require forming a resistance layer on the current collector surface, as described in Patent Document 1. Accordingly, it is possible to provide an excellent lithium ion secondary battery achieving both safety and output characteristics.

BEST MODE FOR CARRYING OUT THE INVENTION

Figure 1:
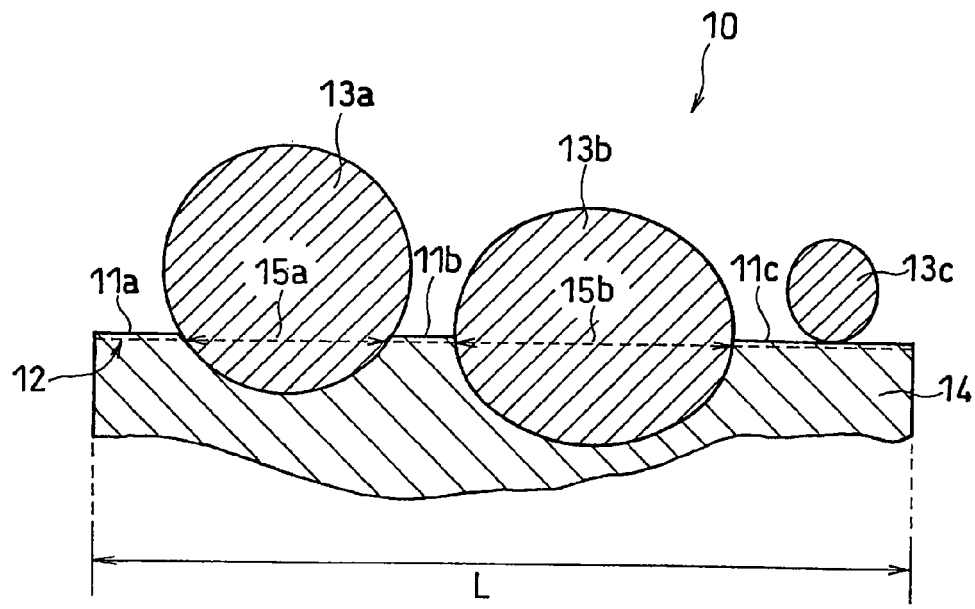
FIG. 1 is a schematic diagram of a cut surface obtained by simultaneously cutting a material mixture and a current collector vertically to an electrode plane.

The present invention relates to an electrode including a material mixture containing active material particles capable of reversibly absorbing and desorbing lithium, and a current collector that carries the material mixture. The surface of the current collector has recessed portions. A feature of the present invention lies in the control of the ratio of the area of the recessed portions to the material mixture carrying area, the depth of the recessed portions, or a change in the thickness of the current collector resulting from the formation of the recessed portions.

When a cut surface obtained by simultaneously cutting the material mixture and the current collector vertically to an electrode plane is magnified, the recessed portions formed by partially embedding active material particles or the like can be observed. For example, the electrode of the present invention is impregnated with a resin, and the resin is cured. Thereafter, a portion of the current collector that carries the material mixture on both surfaces is cut in a direction vertical to the electrode plane. The obtained cut surface preferably is polished. Subsequently, the polished cut surface is observed with an optical microscope, SEM (scanning electron microscope) or the like. In the polished cut surface, recessed portions formed by partially embedding the active material particles are observed on the current collector surface.

The partial embedding of the active material particles hardly occurs in the conventional electrode production process. Accordingly, in order to form recessed portions as described above, for example, it is necessary to control the relationship between the hardness of the current collector and the hardness of the active material particles, as well as to simultaneously roll the material mixture and the current collector. For example, by carrying out a rolling step after the current collector is subjected to a softening process, the recessed portions as described above can be formed.

The electrode of the present invention has any of the following features <1> to <3> described below.

<1> In a cut surface obtained by simultaneously cutting the material mixture and the current collector vertically to the electrode plane, portions of the current collector surface that do not form recessed portions are approximated with a straight line. The ratio of the total length ($\Delta L$) of line segments that are removed by recessed portions to the length (L) of the obtained approximated straight line: $100 \times \Delta L/L$ (hereinafter referred to as "the ratio of recessed portion area") is not less than 30%. The ratio of recessed portion area preferably is not less than 50%, and more preferably not less than 70%. Although not limited to, the ratio of recessed portion area preferably is not less than 95%.

<2> In a cut surface obtained by simultaneously cutting the material mixture and the current collector vertically to the electrode plane, the maximum depth of the recessed portions is not less than 1 μm. The maximum depth of the recessed portions preferably is not less than 3 μm, and more preferably not less than 5 μm. From the viewpoint of retaining the strength of the current collector, the maximum depth of the recessed portions preferably is not greater than half the thickness of the current collector.

<3> In a cut surface obtained by simultaneously cutting the material mixture and the current collector vertically to the electrode plane, a difference between the average thickness of the current collector and the maximum thickness of the current collector is not less than 0.35 μm. The difference between the average thickness and the maximum thickness preferably is not less than 1 μm, and more preferably not less than 1.5 μm. Although not limited thereto, the difference between the average thickness and the maximum thickness preferably is not greater than 4 μm from the viewpoint of retaining the strength of the current collector.

The feature <1> mentioned above will be described with reference to FIG. 1 that schematically shows a polished cut surface. First, in a polished cut surface of an electrode 10, line segments 11a to 11c that are formed by portions of the surface of a current collector 14 that do not form recessed portions are approximated with a straight line 12 having a length L. The obtained approximated straight line 12 corresponds to, for example, a straight line that should be formed by the current collector surface before active material particles 13a to 13c are partially embedded by rolling. Subsequently, the total length $\Delta L$ of line segments 15a to 15b, which are removed by recessed portions, on the straight line having a length L is determined.

If the ratio of recessed portion area determined by $100 \times \Delta L/L$ is less than 30%, under such severe conditions as to cause damage on electrode plates, the exposure of the current collector caused by detachment of the material mixture may not be suppressed sufficiently. The length L may be set to, for example, 200 or 100 μm. For example, when a 100 μm long portion of the interface between the material mixture and the current collector is observed, if the ratio of recessed portion area is not less than 30%, the requirement of the present invention is satisfied.

Figure 2:
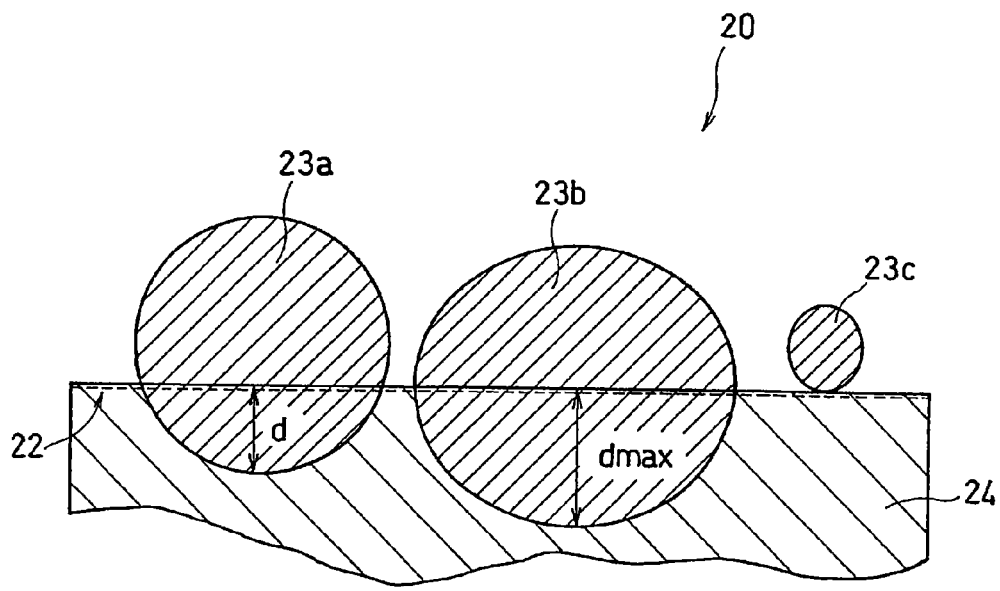
FIG. 2 is a schematic diagram of another cut surface obtained by simultaneously cutting a material mixture and a current collector vertically to an electrode plane.

Next, the feature <2> mentioned above will be described with reference to FIG. 2 that schematically shows a polished cut surface. In an electrode 20, recessed portions on the surface of a current collector 24 that are formed by, for example, partially embedding active material particles 23a to 23c have different depths d. A feature of the electrode according to the present invention lies in that the current collector has recessed portions having a maximum depth dmax of not less than 1 μm. The depth of the recessed portions is determined from the distance between an approximated straight line 22 obtained in the same manner as described above and the deepmost portion of the recessed portions. If the maximum depth of the recessed portions is less than 1 μm, under such severe conditions as to cause damage on electrode plates, the exposure of the current collector caused by detachment of the material mixture may not be suppressed sufficiently. The maximum depth of the recessed portions can be determined from, for example, the recessed portions observed in a 200 or 100 μm long portion of the interface between the material mixture and the current collector.

Figure 3:
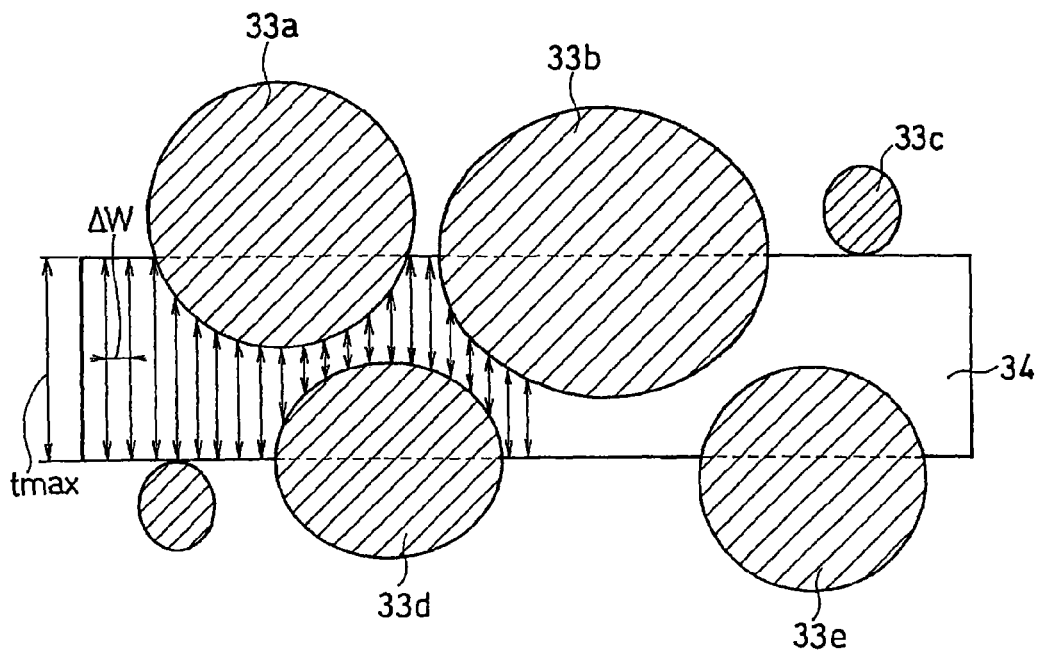
FIG. 3 is a schematic diagram of still another cut surface obtained by simultaneously cutting a material mixture and a current collector vertically to an electrode plane.
Figure 4:
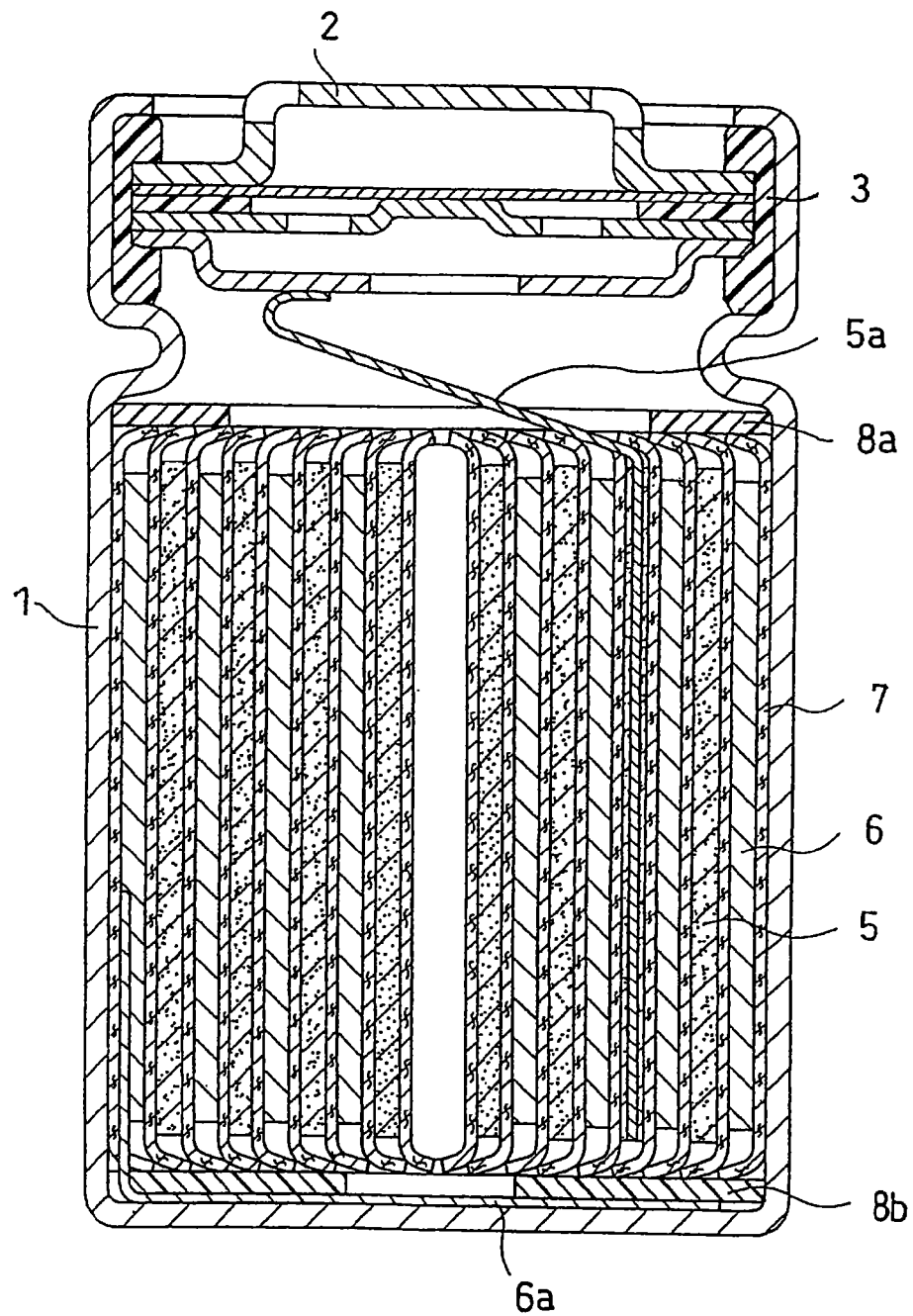
FIG. 4 is a vertical cross sectional view of a cylindrical lithium ion secondary battery according to an example of the present invention.

Next, the feature <3> mentioned above will be described with reference to FIG. 3 that schematically shows a polished cut surface. On the surface of a current collector 34 of an electrode 30, active material particles 33a to 33f are partially embedded. Accordingly, the average thickness of the current collector 34 is reduced as compared to that of the current collector 34 before the active material particles are embedded. The average thickness of the current collector 34 is determined by measuring the thickness of the current collector at every predetermined spacing of ΔW in the cut surface, and averaging the measured thicknesses. The maximum thickness tmax of the current collector usually corresponds to the thickness before the active material particles are embedded. The predetermined spacing ΔW can be set to, for example, 2 μm. For example, in a 200 μm or 100 μm long portion, the thickness of the current collector is measured at about 50 different points. If the difference (tmax−tav) between the average thickness tav of the current collector and the maximum thickness tmax of the current collector is less than 0.35 μm, under such severe conditions as to cause damage on electrode plates, the exposure of the current collector caused by detachment of the material mixture may not be suppressed sufficiently.

In order to verify the above features <1> to <3>, a predetermined length portion of the interface between the material mixture and the current collector in a polished cut surface is observed with a magnification of, for example, 1000. Then, during this process, the ratio of recessed portion area, the maximum depth of the recessed portions, or the difference between the average thickness and the maximum thickness of the current collector preferably is determined. It is also preferable that a similar operation is performed in five different fields of view, and the average value of the five values is used to determine whether or not the electrode has any of the above features.

As the current collector onto which the material mixture is carried, for example, an aluminum foil, an aluminum alloy foil or the like is used. Alternatively, a sheet obtained by coating a nonconductive sheet made of resin or the like with, for example, aluminum or the like is used. The current collector before being subjected to rolling preferably has, but is not limited to, a thickness of 10 to 25 μm. It is preferable that the current collector is subjected to a softening process so that the active material particles can be embedded easily. The softening process is performed by, for example, heating the current collector at 200 to 350° C. The heating atmosphere can be, but is not limited to, for example, an air atmosphere. The heating time, which depends on the heating temperature, may be, for example, 5 to 10 hours. The embedding of the active material particles into the current collector surface is performed by subjecting the current collector on which the material mixture is already carried to rolling using a roll press, for example.

The material mixture contains the active material particles as an essential component, and a conductive material and a binder as optional components. The material mixture is mixed with a liquid component to prepare a material mixture paste. The material mixture paste is applied onto a current collector, followed by drying, whereby the material mixture can be carried on the current collector. In this drying step, by setting the drying temperature to 200 to 350° C., the drying of the material mixture and the softening of the current collector can be done simultaneously. Thereafter, the current collector carrying the material mixture is rolled at a linear pressure of 10 to 15 kN/cm using a roll press. Thereby, the active material particles are partially embedded into the current collector surface. The temperature of the current collector during the rolling can be, but is not limited to, for example, 10 to 50° C.

The active material particles preferably contain, but are not limited to, a lithium-containing composite oxide. From the viewpoint of insuring capacity as well as a hardness enough to be embedded into a current collector, it is preferable that the lithium-containing composite oxide is represented by formula (1): $Li_xCo_{1-y-z}Ni_yM_zO_2$ (where M is at least one element selected from the group consisting of Mn, Ti, Y, Nb, Mo, W, Al, Mg, Ca, Sr and Ba, and $0.97 \leq x \leq 1.1$, $0.05 \leq y \leq 1$ and $0 \leq z \leq 0.35$ are satisfied).

Particularly, it is preferable to use, as the element M, Mn, Al, Sr, W or the like because the embedding into the current collector surface will be easy, a high capacity is obtained, and the thermal stability of the crystal is high.

In formula (1), the value of x is a value of the composite oxide before included in the material mixture, and after the material mixture is incorporated into a battery as a positive electrode active material, the value varies by charge and discharge.

The value of y that represents the content of Ni preferably is, but is not limited to, not less than 0.05, or not less than 0.2 so as to make it easy for the active material particles to be embedded into the current collector. From the viewpoint of enhancing the effect by combining Ni and other element(s), the value of y preferably is not greater than 0.6.

The value of z that represents the content of the element M preferably comprises, but is not limited to, not greater than 0.35 considering the balance between the ease of embedding of the active material particles into the current collector surface and the capacity.

More preferably, the value of y and the value of z fall within the following ranges: $0.3 \leq y \leq 0.6$ and $0.2 \leq z \leq 0.35$.

The active material particles preferably have a volume based average particle size (median size: D50) of, for example, 5 to 10 μm. If the average particle size of the active material particles is too large, discharge performance may be impaired. If the average particle size of the active material particles is too small, the embedding of the active material particles into the current collector surface may become difficult.

The optional components to be included in the material mixture, that is, a conductive material, a binder and the like, are not specifically limited. Similarly, there is no particular limitation on other component materials of a lithium ion secondary battery in which the electrode of the present invention is to be incorporated, such as a counter electrode (e.g., negative electrode), a non-aqueous electrolyte and a separator.

The present invention will be described in detail with reference to examples, but it should be understood that the present invention is not limited to the examples given below.

Example 1

(i) Production of Positive Electrode

As a positive electrode active material, $LiCoO_2$, that is, a lithium-containing composite oxide represented by formula (1): $Li_xCo_{1-y-z}Ni_yM_zO_2$ where y=z=0, having an average particle size of 7.5 μm was used.

The positive electrode active material was mixed with acetylene black serving as a conductive material and polytetrafluoroethylene (PTFE) serving as a binder at a weight ratio of 90:5:5, to which an appropriate amount of an aqueous solution of 1 wt % carboxymethyl cellulose (CMC) was added so as to obtain a positive electrode material mixture slurry.

The positive electrode material mixture slurry was applied onto both surfaces of a 15 Nm thick aluminum foil serving as a current collector, followed by drying at 110° C. The current collector was then heated at 275° C. for 6 hours to soften the current collector. Subsequently, the current collector carrying the positive electrode material mixture was rolled with a linear pressure of 14 kN/cm using a roll press having rollers with a diameter of 0.4 m to form positive electrode material mixture layers having a predetermined thickness. Thereafter, the obtained electrode plate was cut to obtain a positive electrode having a shape that would allow the positive electrode to be inserted into a cylindrical battery case having a diameter of 18 mm and a height of 65 mm.

(ii) Production of Negative Electrode

Artificial graphite and styrene butadiene rubber (SBR) available from JSR Corporation were mixed at a weight ratio of 95:5, to which an appropriate amount of an aqueous solution of 1 wt % CMC was added to obtain a negative electrode material mixture slurry.

The negative electrode material mixture slurry was applied onto both surfaces of a 10 μm thick copper foil serving as a current collector, followed by drying. The current collector carrying the negative electrode material mixture was rolled with a linear pressure of 14 kN/cm using a roll press having rollers with a diameter of 0.4 m to form negative electrode material mixture layers having a predetermined thickness. Thereafter, the obtained electrode plate was cut to obtain a negative electrode having a shape that would allow the negative electrode to be inserted into a cylindrical battery case having a diameter of 18 mm and a height of 65 mm.

(iii) Preparation of Electrolyte

A non-aqueous electrolyte was prepared by dissolving lithium hexafluorophosphate ($LiPF_6$) at a concentration of 1 mol/L in a mixed solvent of ethylene carbonate and methyl ethyl carbonate mixed at a volume ratio of 1:3.

(iv) Assembly of Battery

As shown in FIG. 1, the positive electrode 5 and the negative electrode 6 were spirally wound with a separator 7 interposed therebetween to obtain a spirally-wound electrode assembly. As the separator 7, a composite film (Celgard 2300 available from Celgard Inc., thickness: 25 μm) of polyethylene and polypropylene was used.

A positive electrode lead 5a and a negative electrode lead 6a, which were made of nickel, were attached to the positive electrode 5 and the negative electrode 6, respectively. An upper insulating plate 8a was placed on the upper surface of this electrode assembly, and a lower insulating plate 8b was placed on the lower surface of the same. Then, the electrode assembly was inserted into a battery case 1, after which the non-aqueous electrolyte in an amount of 5 g was injected into the battery case 1. Thereafter, a sealing plate 2 equipped with an insulating gasket 3 therearound and the positive electrode lead 5a were electrically connected. Finally, the opening of the battery case 1 was sealed with the sealing plate 2. Thus, a 18650 cylindrical lithium ion secondary battery (nominal capacity: 2 Ah) was produced.

Examples 2 to 57

Positive electrodes were produced in the same manner as in Example 1, except that lithium-containing composite oxides (average particle size: 7 to 8.5 μm) represented by formula (1): $Li_xCo_{1-y-z}Ni_yM_zO_2$ where the value of y and the value of x were changed as shown in Tables 1 and 2, was used as the positive electrode active materials. Then, lithium ion secondary batteries were produced in the same manner.

Examples 58 to 60

An aluminum foil serving as a current collector was rolled by three types of embossed rollers having different irregularities to form recessed portions on both surfaces of the aluminum foil. The rollers had a diameter of 150 mm, and the roller surfaces were embossed using a YAG laser (ML-2650B) available from Miyachi Corporation. Using three current collectors thus produced, three positive electrodes were produced in the same manner as in Example 1, except that the current collectors were not subjected to the softening process. Then, three lithium ion secondary batteries were produced in the same manner.

Example 61

A positive electrode was produced in the same manner as in Example 1, except that predetermined recessed portions were formed directly on both surfaces of an aluminum foil using a YAG laser (ML-2650B) available from Miyachi Corporation, and that the current collector was not subjected to the softening process. Then, a lithium ion secondary battery was produced in the same manner.

Example 62

A positive electrode was produced in the same manner as in Example 1, except that recessed portions were formed by polishing both surfaces of an aluminum foil using a metal brush (made of SUS, wire diameter: 0.5 mm), and that the current collector was not subjected to the softening process. Then, a lithium ion secondary battery was produced in the same manner.

Example 63

A positive electrode was produced in the same manner as in Example 1, except that predetermined recessed portions were formed on both surfaces of an aluminum foil by a sandblasting process using alumina particles having an average particle size of 5 μm, and that the current collector was not subjected to the softening process. Then, a lithium ion secondary battery was produced in the same manner.

Comparative Example 1

A positive electrode was produced in the same manner as in Example 1, except that the softening process by heating the current collector carrying the positive electrode material mixture was not performed, and that a predetermined resistance layer (thickness: 5 μm) was formed. Then, a lithium ion secondary battery was produced in the same manner. The resistance layer was formed by applying carbon powders and a polyimide resin on the surface as described in Patent Document 1.

Comparative Example 2

A positive electrode was produced in the same manner as in Example 1, except that the softening process by heating the current collector carrying the positive electrode material mixture was performed at 140° C. Then, a lithium ion secondary battery was produced in the same manner.

TABLE 1

$LiCo_{1-y-z}Ni_yM_zO_2$

| Example No. | Amount of Ni (value of y) | Type of M | | Amount of M (value of z) |
|---|---|---|---|---|
| 1 | 0 | — | — | 0 |
| 2 | 0.05 | — | — | 0 |
| 3 | 0.6 | — | — | 0 |
| 4 | 1 | — | — | 0 |
| 5 | 0.3 | Mn | — | 0.3 |
| 6 | 0.3 | Mn | — | 0.35 |
| 7 | 0.3 | Mn | — | 0.38 |
| 8 | 0.3 | Mn | Ti | 0.35 (Mn:Ti = 0.3:0.05) |
| 9 | 0.3 | Mn | Y | 0.35 (Mn:Y = 0.3:0.05) |
| 10 | 0.3 | Mn | Nb | 0.35 (Mn:Nb = 0.3:0.05) |
| 11 | 0.3 | Mn | Mo | 0.35 (Mn:Mo = 0.3:0.05) |
| 12 | 0.3 | Mn | W | 0.35 (Mn:W = 0.3:0.05) |
| 13 | 0.3 | Mn | Al | 0.35 (Mn:Al = 0.3:0.05) |
| 14 | 0.3 | Mn | Mg | 0.35 (Mn:Mg = 0.3:0.05) |
| 15 | 0.3 | Mn | Ca | 0.35 (Mn:Ca = 0.3:0.05) |
| 16 | 0.3 | Mn | Sr | 0.35 (Mn:Sr = 0.3:0.05) |
| 17 | 0.3 | Mn | Ba | 0.35 (Mn:Ba = 0.3:0.05) |
| 18 | 0.3 | Ti | — | 0.35 |
| 19 | 0.3 | Y | — | 0.35 |
| 20 | 0.3 | Nb | — | 0.35 |
| 21 | 0.3 | Mo | — | 0.35 |
| 22 | 0.3 | W | — | 0.35 |
| 23 | 0.3 | Al | — | 0.35 |
| 24 | 0.3 | Mg | — | 0.35 |
| 25 | 0.3 | Ca | — | 0.35 |
| 26 | 0.3 | Sr | — | 0.35 |
| 27 | 0.3 | Ba | — | 0.35 |
| Comp. Ex. 1 | 0 | — | — | 0 |
| Comp. Ex. 2 | 0 | — | — | 0 |

TABLE 2

$LiCo_{1-y-z}Ni_yM_zO_2$

| Example No. | Amount of Ni (value of y) | Type of M | | Amount of M (value of z) |
|---|---|---|---|---|
| 28 | 0.3 | Al | Ti | 0.35 (Al:Ti = 0.175:0.175) |
| 29 | 0.3 | Al | Y | 0.35 (Al:Y = 0.175:0.175) |
| 30 | 0.3 | Al | Nb | 0.35 (Al:Nb = 0.175:0.175) |
| 31 | 0.3 | Al | Mo | 0.35 (Al:Mo = 0.175:0.175) |
| 32 | 0.3 | Al | W | 0.35 (Al:W = 0.175:0.175) |
| 33 | 0.3 | Al | Mn | 0.35 (Al:Mn = 0.175:0.175) |
| 34 | 0.3 | Al | Mg | 0.35 (Al:Mg = 0.175:0.175) |
| 35 | 0.3 | Al | Ca | 0.35 (Al:Ca = 0.175:0.175) |
| 36 | 0.3 | Al | Sr | 0.35 (Al:Sr = 0.175:0.175) |
| 37 | 0.3 | Al | Ba | 0.35 (Al:Ba = 0.175:0.175) |
| 38 | 0.3 | Ti | — | 0.36 |
| 39 | 0.3 | Y | — | 0.36 |
| 40 | 0.3 | Nb | — | 0.36 |
| 41 | 0.3 | Mo | — | 0.36 |
| 42 | 0.3 | W | — | 0.36 |
| 43 | 0.3 | Mn | — | 0.36 |
| 44 | 0.3 | Mg | — | 0.36 |
| 45 | 0.3 | Ca | — | 0.36 |
| 46 | 0.3 | Sr | — | 0.36 |
| 47 | 0.3 | Ba | — | 0.36 |
| 48 | 0.3 | Al | Ti | 0.36 (Al:Ti = 0.18:0.18) |
| 49 | 0.3 | Al | Y | 0.36 (Al:Y = 0.18:0.18) |
| 50 | 0.3 | Al | Nb | 0.36 (Al:Nb = 0.18:0.18) |
| 51 | 0.3 | Al | Mo | 0.36 (Al:Mo = 0.18:0.18) |
| 52 | 0.3 | Al | W | 0.36 (Al:W = 0.18:0.18) |
| 53 | 0.3 | Al | Mn | 0.36 (Al:Mn = 0.18:0.18) |
| 54 | 0.3 | Al | Mg | 0.36 (Al:Mg = 0.18:0.18) |
| 55 | 0.3 | Al | Ca | 0.36 (Al:Ca = 0.18:0.18) |
| 56 | 0.3 | Al | Sr | 0.36 (Al:Sr = 0.18:0.18) |
| 57 | 0.3 | Al | Ba | 0.36 (Al:Ba = 0.18:0.18) |

[Evaluation of Positive Electrode]

A positive electrode was impregnated with a resin, and the resin was cured. Specifically, a positive electrode was introduced into a resin adhesive (HARDENER) available from Nagase ChemteX Corporation, which was then degassed under a reduced pressure, after which the resin was cured together with the positive electrode. Thereafter, a portion of the current collector carrying the material mixture on both surfaces was cut in a direction vertical to the electrode plane. The obtained cut surface was polished. Subsequently, the cut surface was observed with an SEM. Five different SEM images were obtained for each positive electrode. The magnification of the SEM images was set to 1000.

(Ratio of Recessed Portion Area)

In each of five SEM images, a 100 μm long portion of the interface between the material mixture and the current collector was observed. Then, using line segments formed by portions of the current collector surface not forming recessed portions, an approximated straight line having a length L=100 μm was assumed in the SEM image. Subsequently, the total length ΔL (unit: μm) of line segments that were removed by recessed portions in the approximated straight line was determined. From 100×ΔL/L, the ratio of recessed portion area (%) was determined. Five average values of the ratio of recessed portion area are shown in Tables 3 and 4.

(Maximum Depth of Recessed Portion: dmax)

In each of five SEM images, a 100 μm long portion of the interface between the material mixture and the current collector was observed. In that length portion, an active material particle that was embedded deepest into the current collector surface was selected. Then, from the distance between the above approximated straight line and the deepest portion of the recessed portion formed by the selected active material particle, the maximum depth dmax (unit: μm) of the recessed portions was determined. Five average values of dmax are shown in Tables 3 to 5.

(Difference between Average Thickness and Maximum Thickness of Current Collector)

In each of five SEM images, the thickness of the current collector was measured at 50 points with a spacing of 2 μm in a 100 μm long portion, and the average value tav (unit: μm) of the 50 measured values was determined. The maximum thickness tmax of the current collector was the same as that before the positive electrode material mixture slurry was applied, namely, 15 μm. Five average values of tmax−tav=15−tav are shown in Tables 3 to 5.

[Evaluation of Battery]

(Discharge Capacity Retention Ratio)

A battery was charged and discharge under the following conditions 1 and 2, and the ratio of the discharge capacity obtained under the conditions 1 to the discharge capacity obtained under the conditions 2 was determined in percentage. The results are shown in Tables 3 to 5.

<Conditions 1>

Constant current charge: maximum current of 1.4 A, end-of-charge voltage of 4.2 V Constant voltage charge: voltage of 4.2 V, end-of-charge current of 0.1 A Constant current discharge: current of 4 A, end-of-discharge voltage of 3.0 V <Conditions 2>

Constant current charge: maximum current of 1.4 A, end-of-charge voltage of 4.2 V Constant voltage charge: voltage of 4.2 V, end-of-charge current of 0.1 A Constant current discharge: current of 0.4 A, end-of-discharge voltage of 3.0 V (Nail Penetration Test)

After the evaluation of discharge capacity retention ratio, each battery was subjected to the following charge in an environment of 20° C.

Constant current charge: current of 1.4 A, end-of-charge voltage of 4.25 V

Constant voltage charge: voltage of 4.25 V, end-of-charge current of 0.1 A

The charged battery was penetrated from its side with a round iron nail having a diameter of 2.5 mm at a ratio of 5 mm/sec. Two minutes after the penetration, the surface temperature of the battery was measured. The results are shown in Tables 3 to 5.

TABLE 3

|   | 100ΔL/L (%) | dmax (μm) | tmax − tav (μm) | Discharge capacity retention ratio (%) | Surface temperature (° C.) |
|---|---|---|---|---|---|
| 1 | 33 | 1.23 | 0.41 | 88 | 83 |
| 2 | 51 | 1.8 | 0.45 | 87 | 76 |
| 3 | 66 | 2.5 | 0.48 | 83 | 65 |
| 4 | 72 | 2.8 | 0.49 | 81 | 62 |
| 5 | 85 | 3.1 | 0.5 | 89 | 56 |
| 6 | 88 | 3.2 | 0.51 | 85 | 53 |
| 7 | 90 | 3.3 | 0.51 | 76 | 45 |
| 8 | 91 | 3.7 | 0.55 | 85 | 42 |
| 9 | 91 | 3.7 | 0.55 | 85 | 42 |
| 10 | 89 | 3.5 | 0.54 | 84 | 44 |
| 11 | 90 | 3.6 | 0.56 | 84 | 46 |
| 12 | 90 | 3.5 | 0.55 | 85 | 45 |
| 13 | 91 | 3.7 | 0.55 | 85 | 42 |
| 14 | 91 | 3.7 | 0.55 | 85 | 43 |
| 15 | 89 | 3.5 | 0.54 | 84 | 46 |
| 16 | 89 | 3.5 | 0.55 | 84 | 46 |
| 17 | 89 | 3.6 | 0.54 | 84 | 45 |
| 18 | 85 | 3.2 | 0.5 | 84 | 55 |
| 19 | 86 | 3.1 | 0.51 | 85 | 55 |
| 20 | 87 | 3.2 | 0.51 | 85 | 55 |
| 21 | 86 | 3.2 | 0.5 | 85 | 54 |
| 22 | 86 | 3.2 | 0.51 | 85 | 53 |
| 23 | 88 | 3.2 | 0.51 | 86 | 50 |
| 24 | 88 | 3.2 | 0.51 | 87 | 51 |
| 25 | 87 | 3.1 | 0.5 | 85 | 53 |
| 26 | 86 | 3.1 | 0.5 | 85 | 53 |
| 27 | 86 | 3.1 | 0.5 | 85 | 53 |
| Comp. Ex. 1 | 0 | 0 | 0 | 63 | 50 |
| Comp. Ex. 2 | 28 | 0.86 | 0.3 | 88 | 122 |

TABLE 4

|   | 100ΔL/L (%) | dmax (μm) | tmax − tav (μm) | Discharge capacity retention ratio (%) | Surface temperature (° C.) |
|---|---|---|---|---|---|
| 28 | 92 | 3.5 | 0.57 | 82 | 46 |
| 29 | 92 | 3.5 | 0.57 | 82 | 47 |
| 30 | 91 | 3.5 | 0.56 | 83 | 47 |
| 31 | 91 | 3.5 | 0.55 | 82 | 48 |
| 32 | 92 | 3.5 | 0.56 | 84 | 49 |
| 33 | 93 | 3.5 | 0.57 | 84 | 46 |
| 34 | 93 | 3.5 | 0.57 | 82 | 46 |
| 35 | 92 | 3.5 | 0.55 | 83 | 47 |
| 36 | 91 | 3.5 | 0.55 | 83 | 49 |
| 37 | 92 | 3.5 | 0.55 | 83 | 49 |
| 38 | 86 | 3.3 | 0.58 | 69 | 53 |
| 39 | 87 | 3.1 | 0.57 | 70 | 52 |
| 40 | 88 | 3.3 | 0.55 | 70 | 52 |
| 41 | 87 | 3.4 | 0.53 | 70 | 50 |
| 42 | 86 | 3.3 | 0.54 | 70 | 49 |
| 43 | 89 | 3.3 | 0.53 | 72 | 46 |
| 44 | 89 | 3.3 | 0.53 | 73 | 47 |
| 45 | 87 | 3.3 | 0.54 | 70 | 49 |
| 46 | 87 | 3.2 | 0.53 | 70 | 48 |
| 47 | 86 | 3.1 | 0.53 | 71 | 48 |
| 48 | 93 | 3.7 | 0.6 | 67 | 41 |
| 49 | 93 | 3.6 | 0.59 | 68 | 43 |
| 50 | 92 | 3.6 | 0.59 | 68 | 43 |
| 51 | 91 | 3.7 | 0.59 | 67 | 44 |
| 52 | 93 | 3.6 | 0.6 | 69 | 45 |
| 53 | 94 | 3.6 | 0.6 | 68 | 40 |
| 54 | 94 | 3.6 | 0.61 | 67 | 42 |
| 55 | 92 | 3.7 | 0.59 | 68 | 42 |
| 56 | 91 | 3.7 | 0.59 | 70 | 43 |
| 57 | 93 | 3.5 | 0.59 | 68 | 46 |

TABLE 5

|   | 100ΔL/L (%) | dmax (μm) | tmax − tav (μm) | Discharge capacity retention ratio (%) | Surface temperature (° C.) |
|---|---|---|---|---|---|
| 58 | 51 | 1.8 | 0.7 | 88 | 76 |
| 59 | 73 | 3.1 | 1.1 | 89 | 49 |
| 60 | 90 | 5.4 | 1.6 | 89 | 39 |
| 61 | 80 | 4.3 | 0.49 | 89 | 48 |
| 62 | 92 | 3.3 | 0.43 | 88 | 52 |
| 63 | 93 | 3.5 | 0.45 | 89 | 50 |

[Analysis of Results]

The embedding of the active material particles into the current collector occurred more efficiently in the case where the active material particles contained Co and Ni than in the case where the active material particles contained only Co as a transition metal. Further, by adding the element M to the active material particles, the embedding of the active material particles into the current collector occurred further more efficiently. Presumably, this is because the addition of the element M increases the hardness of the lithium-containing composite oxide.

For the battery of Comparative Example 1, the temperature increase during the nail penetration test was suppressed, but the internal resistance was high, and the discharge capacity retention ratio was low. For the battery of Comparative Example 2, the temperature increase during the nail penetration test was significant. This is relevant to the fact that the active material particles were not embedded sufficiently into the current collector. Presumably, the material mixture was detached from the current collector due to the impact of the nail penetration, and an exposed portion of the highly conductive current collector was newly formed, which allowed a large current to flow.

On the other hand, in Examples 1 to 57, the active material particles were embedded sufficiently into the current collector, the temperature increase during the nail penetration test was suppressed in all of the batteries. In Examples 1 to 37, the discharge capacity retention ratio also was extremely excellent. In Examples 38 to 57, the discharge capacity retention ratio decreased slightly. This is presumably because the amount of the element M was above the preferred amount.

For example, as can be seen from the comparison between Examples 3 and 5, the embedding of the active material particles into the current collector occurred more easily and the discharge capacity retention ratio was more excellent when the active material contained Mn and Ni in addition to Co than when the active material contained only Ni in addition to Co. From Examples 18 to 27, it was found that even when the element M is an element other than Mn, a similar effect is also obtained. Further, from the comparison between Examples 5 to 7, it was found that the safety in the nail penetration test is improved as the amount of the element M is increased.

From the comparison between Example 7 and Examples 8 to 17, it was found that by incorporating a plurality of elements as the element M into the active material, the capacity retention ratio and the safety during the nail penetration test are further improved. From the comparison between Example 23 and Examples 28 to 37, a similar tendency was observed.

In Examples 58 to 63, it was found that, by forming recessed portions on the surface of an aluminum foil in advance, the adhesion between the current collector and the active material particles is improved, leading to an improvement in safety. Accordingly, even when active material particles that are difficult to embed into the current collector are used, by forming recessed portions on the surface of the current collector in advance, the adhesion between the current collector and the active material particles is improved. Particularly, it was proved from Examples 58 to 60 that the ratio of recessed portion area preferably is not less than 70%, and most effectively not less than 90%. Similarly, the maximum depth of the recessed portions is not less than 1 μm, or not less than 3 μm, and preferably not less than 5 μm. The difference between the average thickness and the maximum thickness of the current collector is not less than 0.35 μm, or not less than 1 μm, and preferably not less than 1.5 μm.

INDUSTRIAL APPLICABILITY

The present invention is applicable to lithium ion secondary batteries in general, and is particularly useful for a lithium ion secondary battery that includes a lithium-containing composite oxide composed mainly of nickel or cobalt as a positive electrode active material. The shape of the lithium ion secondary battery of the present invention is not specifically limited, and may be any shape such as a coin, button, sheet, cylindrical, flat or prismatic shape. The form of the electrode assembly, which includes a positive electrode, a negative electrode and a separator, may be a spirally-wound type, or laminate type. The size of the battery may be small for use in compact portable devices and the like, or may be large for use in electric vehicles and the like. The lithium ion secondary battery of the present invention is applicable to, but not limited to, power sources for, for example, personal digital assistants, portable electronic devices, compact power storage systems for home use, two-wheeled motor vehicles, electric vehicles, hybrid electric vehicles and the like.

The invention claimed is:

1. A method for producing an electrode for a lithium ion secondary battery, comprising steps of:
   applying a material mixture containing active material particles capable of reversibly absorbing and desorbing lithium on a current collector comprising aluminum foil or aluminum alloy foil having a thickness of 10 to 25 μm;
   heating said current collector carrying said material mixture at 200 to 350° C. to soften said current collector;
   rolling said softened current collector carrying said material mixture with a linear pressure of 10 kN/cm to 15 kN/cm, so that said active material particles are partially embedded in said current collector, wherein:
   after the step of rolling, a surface of said current collector has recesses in which said active material particles are partially embedded, and shapes of the recesses conform to shapes of embedded portions of said active material particles, respectively, and
   in a cut surface obtained by simultaneously cutting said material mixture and said current collector vertically to an electrode plane, the maximum depth of said recesses is not less than 3.1 μm,
   said active material particles contain a lithium-containing composite oxide, and said lithium-containing composite oxide is represented by the formula (1): $Li_xCo_{1-y-z}Ni_yM_zO_2$,
   where M is at least one element selected from the group consisting of Mn, Ti, Y, Nb, Mo, W, Al, Mg, Ca, Sr and Ba, and $0.97 \leq x \leq 1.1$, $0.05 \leq y \leq 1$ and $0 \leq z \leq 0.35$ are satisfied.

2. The method for producing an electrode for a lithium ion secondary battery in accordance with claim 1,
   wherein said active material particles have a volume based average particle size of 5 to 10 μm.

3. The method for producing an electrode for a lithium ion secondary battery in accordance with claim 1, wherein the step of heating lasts 5 to 10 hours.

* * * * *